United States Patent
Eveley

(10) Patent No.: US 8,070,177 B2
(45) Date of Patent: Dec. 6, 2011

(54) STEER AXLE ASSEMBLY

(75) Inventor: Nicholas Eveley, Hamilton (CA)

(73) Assignee: Eveley Alignment (CA)

( * ) Notice: Subject to any disclaimer, the term of this patent is extended or adjusted under 35 U.S.C. 154(b) by 35 days.

(21) Appl. No.: 12/772,290

(22) Filed: May 3, 2010

(65) Prior Publication Data

US 2010/0327559 A1 Dec. 30, 2010

(30) Foreign Application Priority Data

Jun. 29, 2009 (CA) .................................... 2670376

(51) Int. Cl.
*B62D 13/00* (2006.01)

(52) U.S. Cl. ............ 280/442; 280/124.116; 280/93.512; 280/98

(58) Field of Classification Search ................... 280/442, 280/443, 98, 99, 124.116, 124.117, 93.512, 280/93.511, 426, 408; 403/263, 333
See application file for complete search history.

(56) References Cited

U.S. PATENT DOCUMENTS

| | | | | | |
|---|---|---|---|---|---|
| 2,615,765 | A | * | 10/1952 | Venable | 384/396 |
| 3,388,923 | A | * | 6/1968 | Maynard | 280/93.512 |
| 5,975,547 | A | * | 11/1999 | Stroh et al. | 280/93.512 |
| 6,217,046 | B1 | * | 4/2001 | Bodin et al. | 280/93.512 |
| 6,623,019 | B2 | * | 9/2003 | Davis | 280/93.512 |
| 6,902,176 | B2 | * | 6/2005 | Gottschalk | 280/93.512 |
| 7,530,583 | B2 | * | 5/2009 | Gottschalk | 280/93.512 |
| 7,815,203 | B2 | * | 10/2010 | Adleman et al. | 280/93.512 |
| 2003/0011160 | A1 | * | 1/2003 | Bodin | 280/93.512 |
| 2003/0062701 | A1 | * | 4/2003 | Davis | 280/93.512 |
| 2004/0232641 | A1 | * | 11/2004 | Kaiser | 280/93.512 |
| 2005/0140111 | A1 | * | 6/2005 | Ziech et al. | 280/124.116 |
| 2005/0218621 | A1 | * | 10/2005 | Ziech et al. | 280/124.116 |

* cited by examiner

*Primary Examiner* — Paul N Dickson
*Assistant Examiner* — Tashiana Adams
(74) *Attorney, Agent, or Firm* — Harness, Dickey & Pierce, P.L.C.

(57) ABSTRACT

An improved steer axle assembly for a trailer is provided in which a tapered roller thrust bearing extends between each lower kingpin yoke thrust face and each lower kingpin sleeve thrust face to transfer load between the lower yoke sleeve and the kingpin sleeve while allowing the yokes to swivel about the kingpins. Upper and lower needle bearing assemblies extend respectively between the upper and lower yoke sleeves and the kingpins to guide the swivelable movement of the yokes about the kingpins. Upper and lower kingpin caps are secured across the upper and lower yoke sleeves respectively above and below the kingpins to seal the opposite ends of the kingpins within the yoke sleeves. At least one of the upper and lower kingpin caps associated with each kingpin has a grease passage extending therethrough for admitting grease into an interior of the yoke sleeves and a grease fitting releaseably coupleable to a pressurized grease supply and sealingly engaging the grease passage to introduce grease into the grease passage.

11 Claims, 5 Drawing Sheets

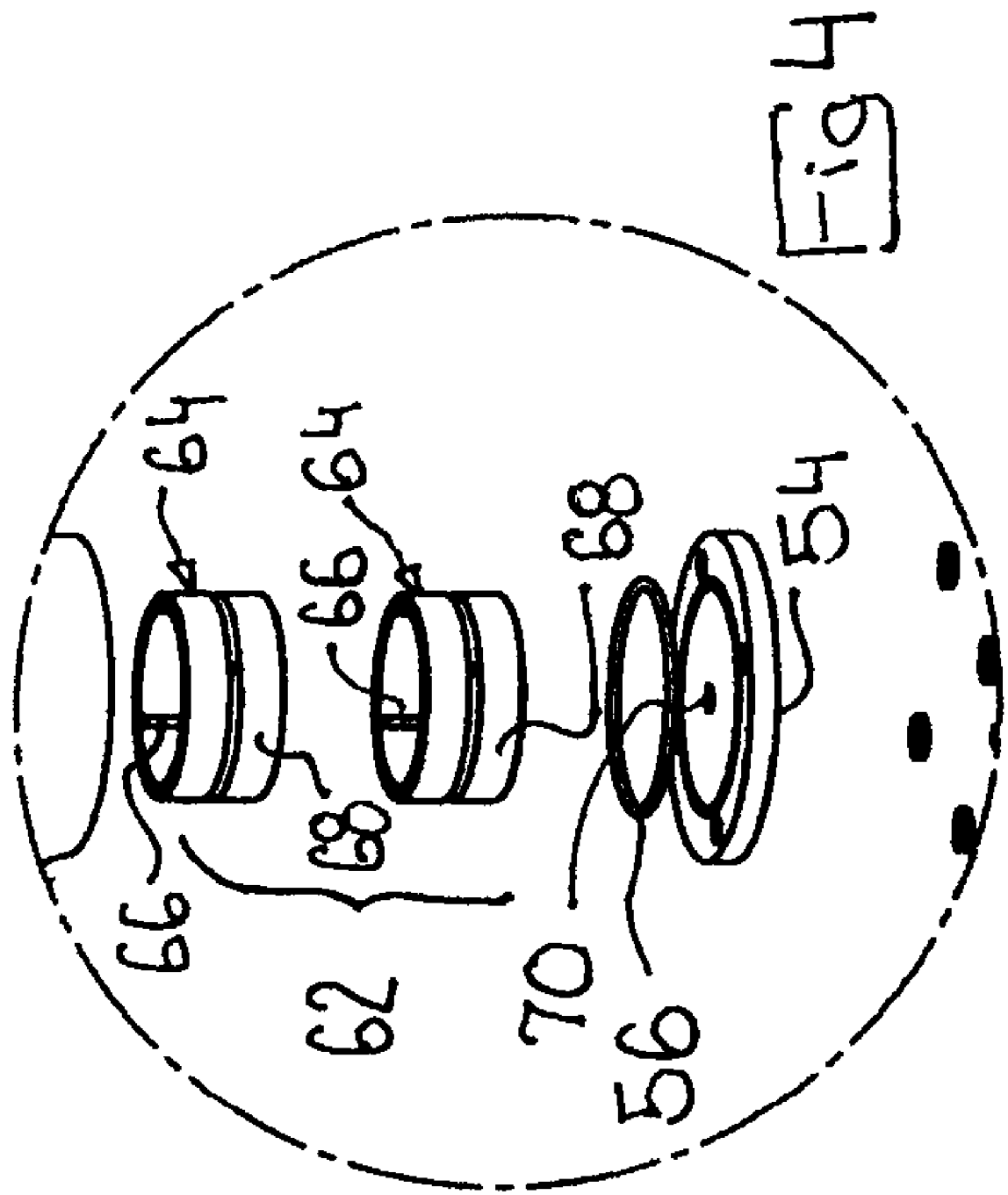

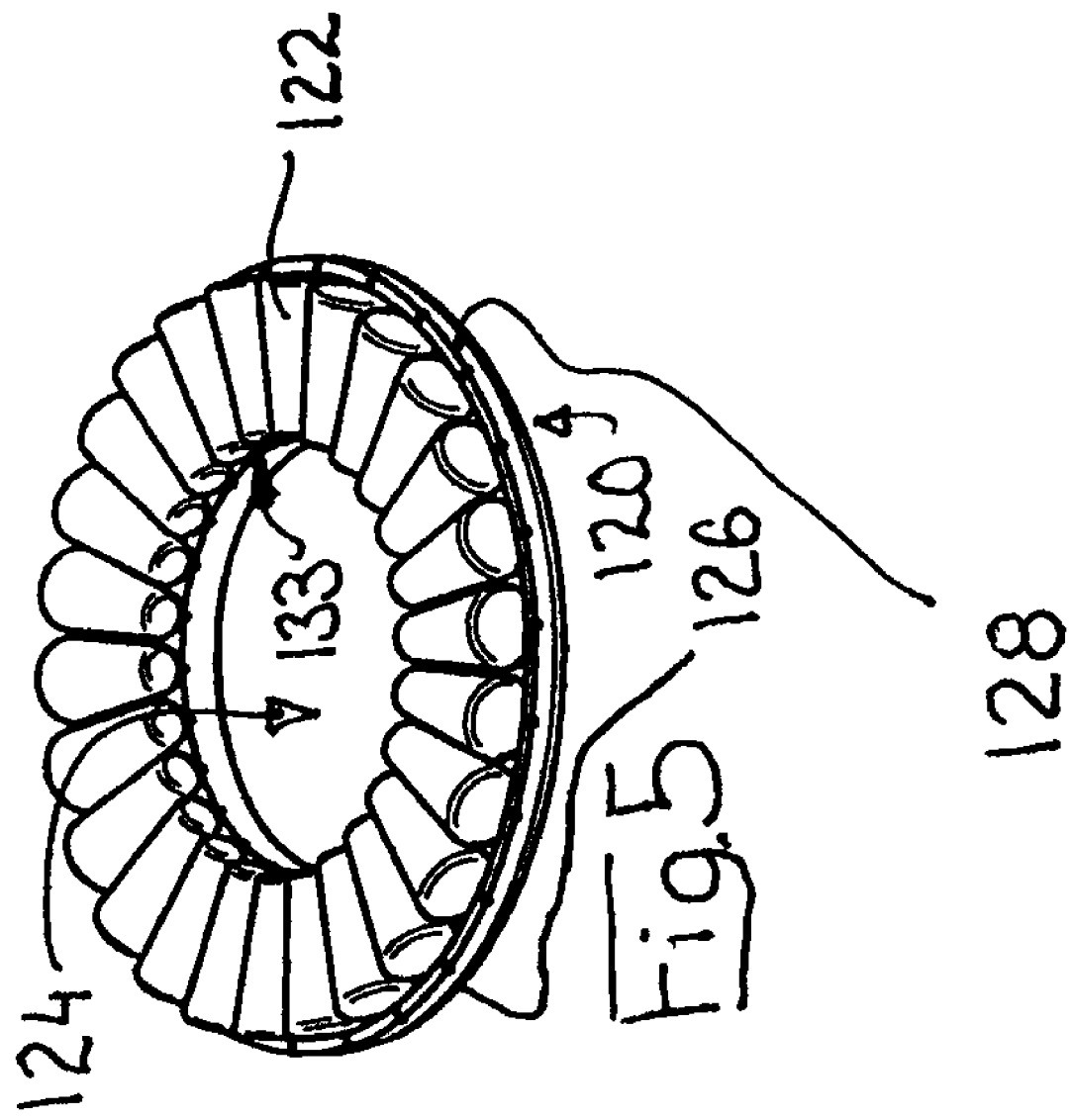

STEER AXLE ASSEMBLY

FIELD OF THE INVENTION

The present invention relates to axle assemblies for trailers and more particularly to self-steering axle assemblies generally referred to as "steer axles".

BACKGROUND OF THE INVENTION

The load carrying capacity of a truck trailer is determined by the number of axles it has, in other words on a "per axle" basis. In some instances carrying capacity of a trailer is enhanced by adding an intermediate axle assembly between the tractor wheelset and the rear wheelset of the trailer.

A challenge with adding an intermediate axle assembly is in steering the trailer when the wheels associated with the intermediate axle assembly are in contact with the underlying ground. One solution to the problem is to raise the intermediate axle assembly to lift the associated wheels off of the ground in turns. A problem with such an approach is that the weight carried by the intermediate axle assembly gets transferred to the remaining axles which may overload and damage any underlying pavement.

An alternative solution to the steering issue is to provide the intermediate axle with steering capabilities. Such is referred to as a "steer axle". A typical steer axle comprises a laterally extending beam having respective spindles mounted to opposite ends thereof. The spindles are in effect stub axles and carry the intermediate wheels. The spindles are carried by yokes which in turn are swivelably connected to the beam by respective kingpin assemblies.

Each kingpin assembly has a kingpin which is rigidly secured in a generally vertical orientation to each end of the beam so as to protrude above and below the beam. The yoke has upper and lower sleeves which receive the kingpin above and below the beam respectively. The upper and lower sleeves are spaced apart and span the portion of the beam surrounding the kingpin.

It will be appreciated that the yoke and the kingpin assembly is subject to a considerable load. The lower sleeve of the yoke supports the overlying portion of the end of the beam and therefore the weight of anything supported by the beam. To reduce friction and wear in this area a bronze thrust washer is interspersed therebetween which in turn encircles the kingpin. The thrust washer has facility for greasing but by its nature does not hold grease well as its faces press directly against the thrust faces of the components adjacent thereto. Hence the thrust washer requires regular and frequent maintenance for any longevity and even with such treatment it tends to be relatively short lived. The yoke to kingpin securement is typically effected using bronze bushings which are pressed into the ends of the sleeves and which are a close fit to the kingpins. The nature of bronze bushings is that they require frequent lubrication absent which their service life is very short and even with frequent lubrication the bushing life is relatively short.

It is an object of the present invention to provide a steer axle assembly which overcomes at least some of the above maintenance and wear problems.

SUMMARY OF THE INVENTION

An improved steer axle assembly for a trailer is provided. The steer axle assembly has a laterally extending beam having a beam axis and respective kingpin sleeves at opposite ends thereof for supporting respective left and right kingpins. Each of the kingpins has a respective kingpin axis generally orthogonal to the beam axis and generally parallel to each other. The kingpin sleeves have generally planar upper and lower kingpin sleeve thrust faces which are generally parallel to each other and to the beam axis. Respective left and right yokes are provided. Each of the yokes has an upper yoke sleeve extending about a respective of the kingpins above the upper kingpin sleeve thrust face and a lower yoke sleeve extending about a respective of the kingpins below the lower kingpin sleeve thrust face. The yokes are swivelable about the kingpins about the kingpin axis. Each upper yoke sleeve has an upper yoke sleeve thrust face generally parallel to and slideably engaging the upper kingpin sleeve thrust face. Each of the lower yoke sleeves has a lower yoke sleeve thrust face facing the lower king pin sleeve thrust face generally parallel thereto but spaced apart therefrom. Each yoke supports a respective axle spindle having a spindle axle assembly with a spindle axis generally parallel to the beam axis. A tie rod assembly extends between the left and right yokes for restraining the yokes to swivel in unison. A stabilizer assembly is provided which acts between the tie rod assembly and the beam to stabilize the swivelling of the yokes about the kingpins. A tapered roller thrust bearing extends between each lower kingpin yoke thrust face and each lower kingpin sleeve thrust face to transfer load between the lower yoke sleeve and the kingpin sleeve while allowing the yokes to swivel about the kingpins. Upper and lower needle bearing assemblies extend respectively between the upper and lower yoke sleeves and the kingpins to guide the swivelable movement of the yokes about the kingpins. Upper and lower kingpin caps are secured across the upper and lower yoke sleeves respectively above and below the kingpins to seal the opposite ends of the kingpins within the yoke sleeves. At least one of the upper and lower kingpin caps associated with each kingpin has a grease passage extending therethrough for admitting grease into an interior of the yoke sleeves and a grease fitting releaseably coupleable to a pressurized grease supply and sealingly engaging the grease passage to introduce grease into the grease passage.

Upper and lower kingpin seals are provided respectively adjacent the upper and lower yoke thrust faces and extending about to the kingpins to sealingly engage the kingpins for inhibiting the ingress of dirt and moisture into the yoke sleeves while allowing excess grease to escape.

The grease passage may extend along the kingpin into a cavity defined by a respective needle bearing sleeve surrounding each of the needle bearings. The grease passage may direct grease escaping from the lower yoke sleeve into the roller bearing to an interior of the roller thrust bearing from an inner diameter thereof. The roller thrust bearing is sealed about its outer periphery to inhibit ingress of dirt and moisture while allowing grease to be discharged therethrough.

The yokes of the steer axle assembly may include a brake rod sleeve extending generally orthogonally to the kingpin axis for receiving a brake rod therethrough and supporting the brake rod for rotation about a brake rod axis generally parallel to the spindle axis.

Each of the needle bearing assemblies may comprise a pair of axially aligned needle bearing races.

The left and right yokes may be substantially minor images of each other.

DESCRIPTION OF DRAWINGS

A detailed description of a preferred embodiment of the present invention is set out below with reference to the accompanying illustrations in which:

FIG. 4 is an enlarged view of the encircled area indicated by reference B in FIG. 2, and;

FIG. 5 is a cross sectional view illustrating an interior of a tapered roller thrust bearing component of a steer axle assembly according to the present invention.

DESCRIPTION OF PREFERRED EMBODIMENTS

Figure 1:
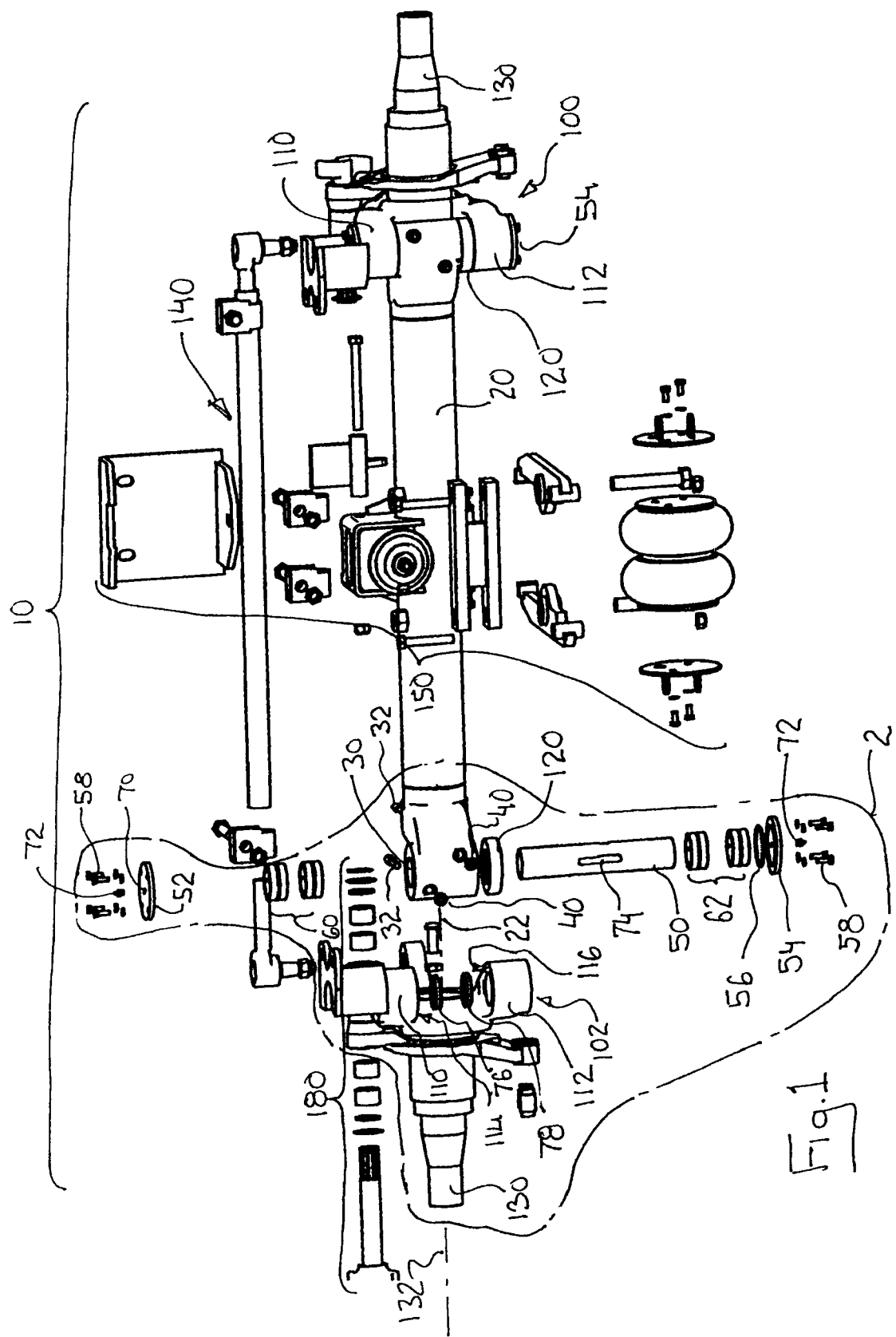
FIG. 1 is an exploded perspective view of a steer axle assembly according to the present invention.
Figure 2:
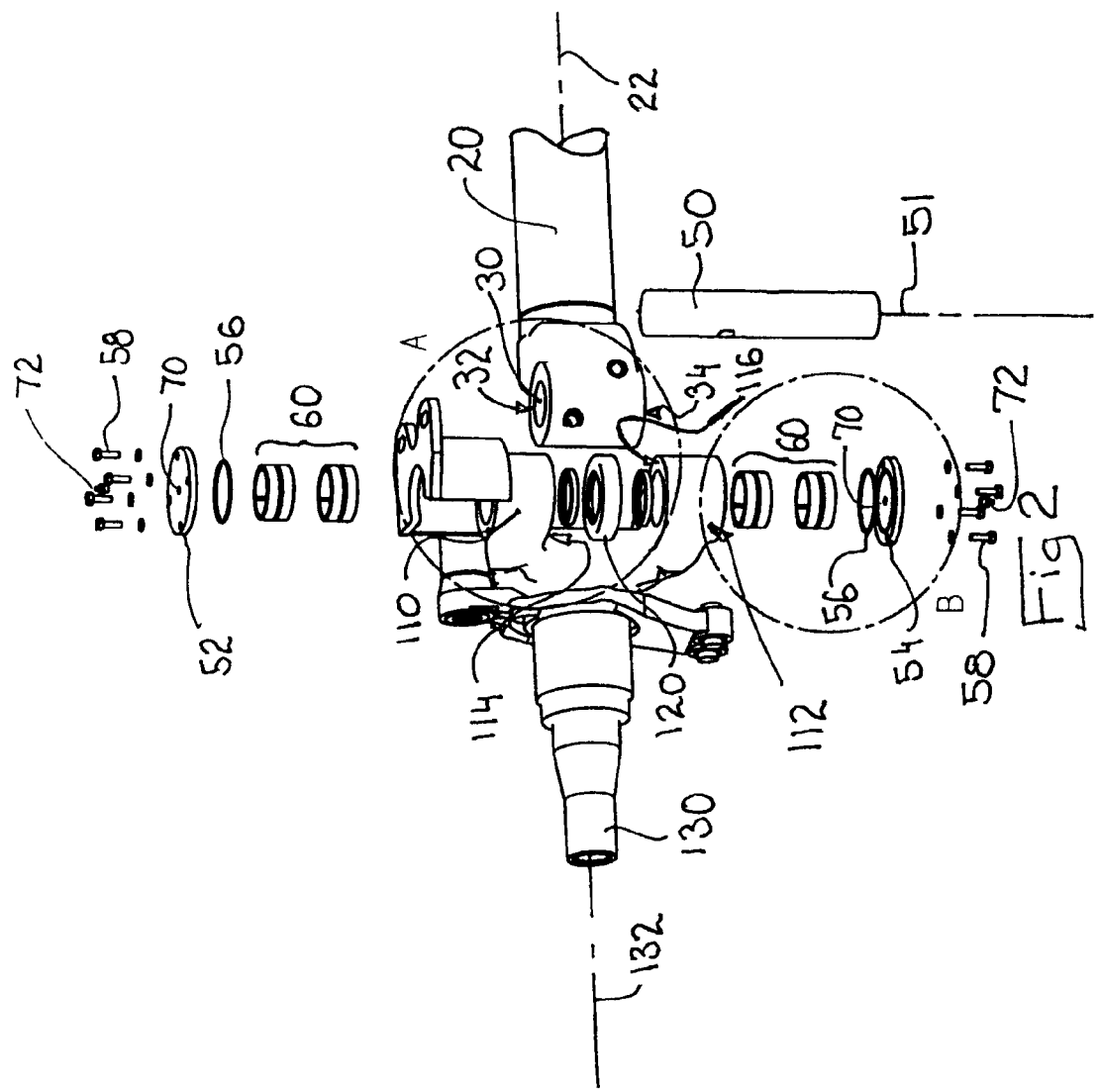
FIG. 2 is an enlargement of the encircled area indicated by reference 2 in FIG. 1.
Figure 3:
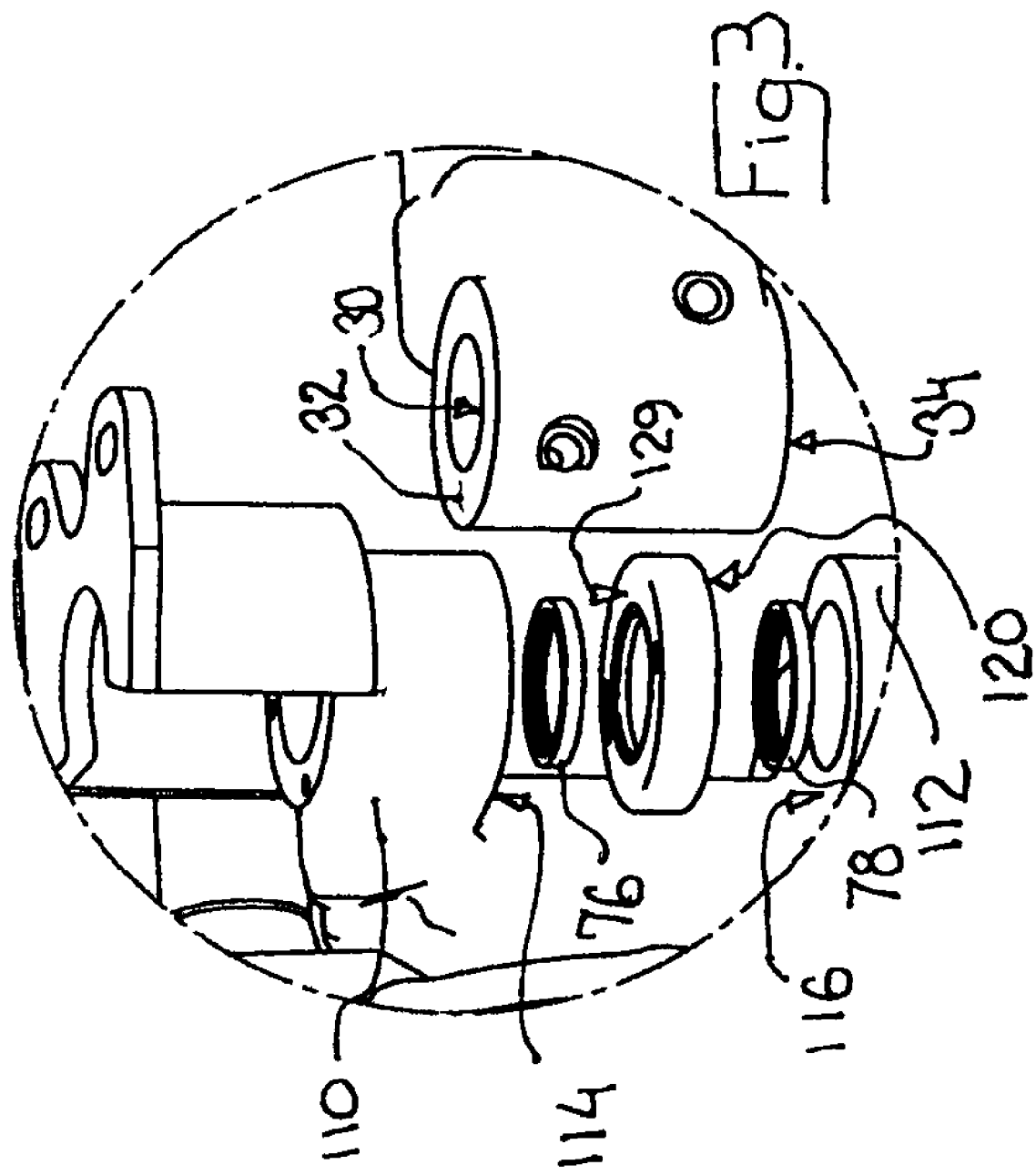
FIG. 3 is an enlarged view of the encircled area indicated by reference A in FIG. 2.

A steer axle assembly is generally indicated by reference 10 in the accompanying illustrations. The steer axle assembly 10 has a beam 20 which extends laterally between a left yoke 100 and a right yoke 102. The left yoke 100 and right yoke 102 are mirror images of each other and accordingly their components are indicated with common reference numerals as applicable and the description of one yoke applies equally to the other. The left and right yokes 100 and 102 respectively are swivelably mounted to opposite ends of the beam 10 by respective left and right kingpins 50 as described in more detail below.

The beam 20 has a beam axis 22. A respective kingpin sleeve 30 is rigidly secured to or integrate with opposite ends of the beam 10. Each kingpin sleeve 30 receives a kingpin 50 and supports the kingpin 50 to secure the kingpins 50 to the ends of the beam 10. Each kingpin 50 has a kingpin axis 51 which is generally orthogonal to the beam axis 22. The kingpin axes 51 are generally parallel. The kingpins 50 are generally a tight sliding fit in the kingpin sleeves 30 and are retained in place by draw keys 32 and flange bolts 34 as is well known in the art.

Each kingpin sleeve 30 has an upper kingpin sleeve thrust face 32 opposite a lower kingpin sleeve thrust face 34. The upper and lower kingpin sleeve thrust faces, 32 and 34 respectively are generally parallel to each other and to said beam axis 22.

The left and right yokes 100 and 102 respectively each have an upper yoke sleeve 110 and a lower yoke sleeve 112. The upper and lower yoke sleeves 110 and 112 are axially aligned and receive the kingpin sleeve 30 therebetween. The upper yoke sleeve 110 extends about the kingpin so above the kingpin sleeve 30 and the lower yoke sleeve 112 extends about the kingpin 50 below the kingpin sleeve 30.

Each upper yoke sleeve 110 has an upper yoke sleeve thrust face 114 generally parallel to and slideably engaging the upper kingpin sleeve thrust face 30. Each lower yoke sleeve 112 has a lower yoke sleeve thrust face 116 facing the lower kingpin sleeve thrust face 34 and generally parallel thereto but spaced apart therefrom. A respective tapered roller thrust bearing 120 is interspersed between the lower kingpin sleeve thrust face 34 and the lower yoke sleeve thrust face 116 to transfer load between the lower yoke sleeve 112 and the kingpin sleeve 30 while allowing the left and right yokes 100 and 102 respectively to swivel about the kingpins.

As can be seen in FIG. 5, the tapered roller bearing 120 comprises a plurality of frusto-conical rollers 122 radially disposed around a passage 124 which receives the kingpin 50. The rollers 122 in turn rest between a pair of tapered seats 126 (only the lowermost is illustrated in FIG. 5) and are prevented from moving radially outwardly by a lip 128 extending about each seat 126. An upper casing 129 covers the rollers 122. A seal (not illustrated) seals between the upper casing 129 and a lower casing 131 beneath the rollers. The seal prevents ingress of dirt and moisture yet allows lubricating grease to escape as discussed in more detail below.

The upper casing 129 and lower casing 131 sealingly engage respectively the lower kingpin sleeve thrust face 34 and the lower yoke sleeve thrust face 116 to inhibit the passage of dirt and moisture radially inwardly.

Upper and lower needle bearing assemblies generally indicate respectively by references 60 and 62 extend between the upper and lower yoke sleeves 110 and 112 respectively and the kingpins 50 to guide the upper and lower yoke sleeves 110 and 112 respectively and in turn the left and right yokes 100 and 102 respectively in swivelling about the kingpins 50.

Each needle bearing assembly may, as illustrated, comprise two needle bearing races 64 which are axially aligned one above the other. Each race 64 comprises a plurality of generally parallel needles 66 disposed radially within a needle bearing sleeve 68.

Upper and lower kingpin caps 52 and 54 respectively are secured across the upper and lower yoke sleeves, 110 and 112 respectively to seal opposite ends of the kingpins 50 within the upper and lower yoke sleeves 110 and 112 respectively. An "O" ring or other seal 56 may be interspersed between the upper and lower yoke sleeves 100 and 112 and the upper and lower kingpin caps 52 and 54. Bolts 58 may be used to secure the caps 52 and 54 to the yoke sleeves 110 and 112.

A grease passage 70 extends through each of the upper and lower kingpin caps 52 and 54 respectively to admit grease into and interior of said upper and lower yoke sleeves 110 and 112 respectively. A grease nipple 72 or other suitable fitting is provided for releaseably coupling to a source of pressurized grease to introduce grease into the grease passage 70.

Upper and lower kingpin seals 76, 78 are received respectively in the upper and lower yoke thrust faces 114 and 116 respectively. The kingpin seals 76 and 78 seal between the kingpin 50 and the upper and lower yoke sleeves 110 and 112 respectively to inhibit the ingress of dirt and moisture into the upper and lower yoke sleeves 110 and 112 respectively. Preferably the upper and lower grease seals 76 and 78 respectively are configured to allow grease to pass by them (escape) during greasing of the needle bearing races 64 without damaging the upper and lower grease seals 76 and 78.

The tapered roller thrust bearing 120 receives grease through in its radially inner face 133. Alternatively the tapered roller thrust bearing 120 may be a permanently sealed bearing.

The use of needle bearing races 64 and the tapered roller thrust bearings 120 enables very tight tolerances on the order of 0.005 inches to be maintained, which is better than would be typical in prior art arrangements utilizing sintered bronze thrust bearings and sleeve bearings (bushings). Such tight tolerances would likely cause seizure in the prior art arrangement through lack of clearance for grease. Furthermore grease will remain almost indefinitely within the bearing assemblies of the present invention rather than being quickly squeezed out as in the prior arrangements.

Each of the left and right yokes 100, 102 supports a respective axle spindle 130 having spindle axis 132 generally parallel to the beam axis 20. Typically the spindle axis 132 will trail the kingpin axis 51 by a small amount to encourage wheels (not shown) rotatably mounted on the spindles 130 to maintain a "straight ahead" position.

A tie rod assembly generally indicated by reference 140 may extend between the left and right yokes 102 and 104 in known arrangement to constrain the yokes 102 and 104 to swivel in unison.

A stabilizer assembly of known configuration is generally indicated by reference 150. The stabilizer assembly 150 acts between the beam 20 and the tie rod 140 to dampen movement of the tie rod 140 and thereby stabilize rotation of the left and right yokes 100 and 102 respectively in their swivelling movement about the kingpins 50.

Respective brake rod assemblies generally indicated by reference 160 such as described in my co-pending U.S. patent application Ser. No. 09/969,781 may be supported by the left and right yokes 100 and 102.

The above description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

The entire disclosure of Canadian Patent Application No. 2670376, filed Jun. 29, 2009 is expressly incorporated by reference herein.

The invention claimed is:

1. In a steer axle assembly for a trailer having a laterally extending beam with a beam axis having respective kingpin sleeve at opposite ends thereof, for supporting respective left and right kingpins each said kingpin having a respective kingpin axis generally orthogonal to said beam axis, said kingpin axes being generally parallel to each other;

said kingpin sleeves having generally parallel upper and lower kingpin sleeve thrust faces which are generally parallel to each other and to said beam axis;

respective left and right yokes each having an upper yoke sleeve extending about a respective of said kingpins above said upper kingpin sleeve thrust faces and a lower yoke sleeve extending about a respective of said kingpins below said lower kingpin sleeve thrust faces, said yokes being swivelable about said kingpins about said kingpin axes;

each said upper yoke sleeve having an upper yoke sleeve thrust face generally parallel to and slideably engaging said upper kingpin sleeve thrust face;

each said lower yoke sleeve having a lower yoke sleeve thrust face facing said lower kingpin sleeve thrust face generally parallel thereto but spaced apart therefrom;

each said yoke supporting a respective axle spindle having a spindle axle assembly with a spindle axis generally parallel to said beam axis;

a tie rod assembly extending between said left and right yokes for restraining said yokes to swivel in unison;

a stabilizer assembly acting between said tie rod assembly and said beam to stabilize said swivelling of said yokes about said kingpins;

the improvement comprising:

a respective tapered roller thrust bearing extending between each said lower kingpin yoke thrust face and each said lower kingpin sleeve thrust face for transferring load between said lower yoke sleeve and said kingpin sleeve while allowing said yokes to swivel about said kingpins;

upper and lower needle bearing assemblies extending respectively between said upper and lower yoke sleeves and said kingpins to guide said swivelable movement of said yokes about said kingpins;

upper and lower kingpin caps securable across said upper and lower yoke sleeves respectively above and below said kingpins to seal opposite ends of said kingpins within said yoke sleeves;

each said kingpin cap having a grease passage extending therethrough for admitting grease into an interior of said yoke sleeves and a grease fitting releaseably coupleable to a pressurized grease supply and sealingly engaging said grease passage to introduce grease into said grease passage;

upper and lower kingpin seals respectively adjacent said upper and lower yoke thrust faces and extending about kingpins to sealingly engage said kingpins for inhibiting the ingress of dirt and moisture into said yoke sleeves yet allowing excess grease to escape.

2. The steer axle assembly of claim 1 wherein said yokes include a brake rod sleeve extending generally orthogonally to said kingpin axis for receiving a brake rod therethrough and supporting said brake rod for rotation about a brake rod axis generally parallel to said spindle axis.

3. The steer axle assembly of claim 1 wherein each said needle bearing assembly comprises a pair of axially aligned needle bearing races.

4. The steer axle assembly of claim 2 wherein each said needle bearing assembly comprises a pair of axially aligned needle bearing races.

5. The steer axle assembly of claim 3 wherein said left and right yokes are substantially minor images of each other.

6. The steer axle assembly of claim 4 wherein said left and right yokes are substantially minor images of each other.

7. The steer axle of claim 3 wherein each said kingpin has at least one grease passage for delivering said grease from said interior of an adjacent of said yoke sleeves to said tapered roller thrust bearing.

8. The steer axle of claim 6 wherein each said kingpin has at least one grease passage for delivering said grease from said interior of an adjacent of said yoke sleeves to said tapered roller thrust bearing.

9. The steer axle of claim 1 wherein said tapered roller thrust bearing is a sealed bearing.

10. The steer axle of claim 6 wherein said tapered roller thrust bearing is a sealed bearing.

11. The steer axle assembly of claim 1 wherein said tapered thrust bearing is mounted in a casing comprising an upper casing sealingly engaging said lower kingpin sleeve thrust face and a lower casing sealingly engaging said lower kingpin yoke thrust face, said tapered thrust bearing admitting grease from a radially inward face and discharging excess grease past a seal extending between said inner and outer casings about a peripheral edge of said inner casing, said seal extending between said inner and outer casings inhibiting ingress of dirt and moisture into said tapered thrust bearing.

* * * * *